(12) United States Patent
Shukla et al.

(10) Patent No.: US 10,666,845 B2
(45) Date of Patent: May 26, 2020

(54) MODULE ISOLATION

(71) Applicant: GoPro, Inc., San Mateo, CA (US)

(72) Inventors: Himay Shukla, San Mateo, CA (US);
Kielan Crow, San Mateo, CA (US);
Pascal Gohl, Winterthur (CH)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/288,427

(22) Filed: Feb. 28, 2019

(65) Prior Publication Data
US 2020/0036873 A1 Jan. 30, 2020

Related U.S. Application Data

(63) Continuation of application No. 16/043,370, filed on Jul. 24, 2018.

(51) Int. Cl.
*H04N 5/225* (2006.01)
*H04N 5/232* (2006.01)
*G03B 17/56* (2006.01)

(52) U.S. Cl.
CPC ......... *H04N 5/2253* (2013.01); *G03B 17/561* (2013.01); *H04N 5/2252* (2013.01); *H04N 5/2254* (2013.01); *H04N 5/23264* (2013.01)

(58) Field of Classification Search
CPC .. H04N 5/2252; H04N 5/2253; H04N 5/2254; H04N 5/23264; G03B 17/561
See application file for complete search history.

(56) References Cited

U.S. PATENT DOCUMENTS

| | | | |
|---|---|---|---|
| 5,005,948 A | 4/1991 | Takahashi | |
| 5,731,834 A * | 3/1998 | Huot | H04N 5/2253 348/340 |
| 7,646,427 B2 | 1/2010 | Sato | |
| 9,639,935 B1 | 5/2017 | Douady-Pleven | |
| 2003/0025824 A1 | 2/2003 | Ishikawa | |
| 2005/0099521 A1 * | 5/2005 | Bleau | H04N 5/2252 348/340 |
| 2005/0219399 A1 | 10/2005 | Sato | |
| 2008/0129838 A1 * | 6/2008 | Minne | B82Y 10/00 348/231.6 |
| 2011/0170000 A1 * | 7/2011 | Hsieh | H04N 5/2252 348/374 |
| 2012/0014688 A1 * | 1/2012 | Ma | G03B 17/02 396/535 |
| 2013/0107111 A1 * | 5/2013 | Campbell | H04N 5/2252 348/373 |
| 2014/0211083 A1 | 7/2014 | Wakikawa | |
| 2016/0006908 A1 * | 1/2016 | Pan | H04N 5/2252 348/148 |

(Continued)

OTHER PUBLICATIONS

International Search Report and Written Opinion for Application No. PCT/US2019/031454, dated Aug. 22, 2019, 8 pages.

*Primary Examiner* — Abdelaaziz Tissire
(74) *Attorney, Agent, or Firm* — Young Basile Hanlon & MacFarlane, P.C.

(57) ABSTRACT

In one aspect of the present disclosure, a module is disclosed for use with a digital image capturing device (DICD) including an integrated sensor-lens assembly (ISLA). The module includes a cradle configured for connection to a housing of the DICD, and at least one dampener that is configured for positioning between the module and the housing of the DICD to reduce vibrations transmitted to the ISLA.

18 Claims, 10 Drawing Sheets

(56) References Cited

U.S. PATENT DOCUMENTS

| | | | |
|---|---|---|---|
| 2016/0112623 A1* | 4/2016 | Fisher | H04N 5/23206 348/211.2 |
| 2016/0191863 A1* | 6/2016 | Minikey, Jr. | H04N 5/2254 348/148 |
| 2016/0212308 A1* | 7/2016 | Ahn | G03B 17/02 |
| 2016/0323560 A1* | 11/2016 | Jin | H04N 5/23267 |
| 2016/0352992 A1* | 12/2016 | Saika | H04N 5/2328 |
| 2016/0360077 A1 | 12/2016 | Miura | |
| 2018/0192034 A1 | 7/2018 | Jin | |
| 2018/0227466 A1* | 8/2018 | Park | H04N 5/2252 |

* cited by examiner

MODULE ISOLATION

CROSS REFERENCE TO RELATED APPLICATIONS

This application is a continuation of U.S. patent application Ser. No. 16/043,370, filed on Jul. 24, 2018, the contents of which are incorporated by reference herein in their entirety.

TECHNICAL FIELD

The present disclosure relates generally to the mounting and stabilization of the internal components of a digital image capturing device (DICD), and more particularly, to the mounting and stabilization of integrated sensor-lens assemblies (ISLAs) and inertial measurement units (IMUs).

BACKGROUND

DICDs are used in various applications, including, for example, handheld cameras and video recorders, drones, and vehicles. DICDs typically include one or more optical elements (e.g., lenses) as well as one or more image sensors to capture and process image data. The optical element(s) capture content by receiving and focusing light, and the captured content is converted to an electronic image signal by the image sensor. The image signal generated by the image sensor is then processed by an image signal processor to form an image. Some DICDs integrate optical elements and optical sensors into a single unit known as an integrated sensor-lens assembly (ISLA).

During use, DICDs are often subject to external forces. For example, when used in action photography and video, a DICD may be worn by a user or attached to the hood of a car, to a surfboard, to the handlebars of a bicycle, or to an unmanned aerial vehicle (e.g., a drone). These external forces create noise and interference that can compromise image and video quality. Some DICDs include components that collect and transmit data to internal processors including programming that is designed to offset the effects of external forces. IMUs, for example, may be used to measure and report the forces and accelerations to which the DICD is subjected using accelerometers, gyroscopes, etc. IMUs, however, are designed to operate in a particular sensitivity range, for example, 2G, 4G, or 16G. Data that is outside of an IMUs sensitivity range is problematic in that the IMU can become saturated, potentially resulting in horizon drift and other errors, particularly in higher sensitivity IMUs wherein saturation may occur more quickly.

To address this concern, the present disclosure describes various structures and methods for dampening external forces, frequencies, vibrations, etc., communicated to IMUs to effectively increase the operable range of the IMUs and mitigate the impact of IMU saturation.

SUMMARY

In one aspect of the present disclosure, a module is disclosed for use with a digital image capturing device (DICD) including an integrated sensor-lens assembly (ISLA). The module includes a cradle that is configured for connection to a housing of the DICD, and at least one dampener. The at least one dampener is positionable between the module and the housing of the DICD and is configured to reduce forces, vibrations, etc., transmitted to the ISLA.

In certain embodiments, the at least one dampener may include a material having a durometer within the range of approximately 10 D to approximately 100 D.

In certain embodiments, the at least one dampener may include a material selected from the group consisting of: polycarbonate, acrylonitrile-butadiene styrene (ABS), polyvinyl chloride (PVC), thermoplastic elastomer, silicone, rubber(s), and polymer(s).

In certain embodiments, the at least one dampener may define an aperture that is configured to receive a fastener.

In certain embodiments, the at least one dampener may be generally toroidal in configuration, whereas in other embodiments, the at least one dampener may define generally planar opposing surfaces.

In certain embodiments, the cradle may include a generally curvate cross-sectional configuration defining a concave receiving space that is configured to accommodate the ISLA.

In certain embodiments, the cradle may define an aperture to permit light to pass therethrough and enter the ISLA.

In certain embodiments, the cradle may include a mounting structure to facilitate connection of the cradle to the housing of the DICD. For example, the mounting structure may include a plurality of brackets. In such embodiments, the brackets may be positioned in corner sections of the cradle and may each define an opening that is configured to receive a fastener to secure the module to the housing of the DICD.

In certain embodiments, the cradle may further include at least one mount that is configured to support the ISLA such that the ISLA can be connected to the cradle.

In certain embodiments, the at least one mount may include a plurality of mounts that are spaced generally equidistant from one another.

In another aspect of the present disclosure, an internal module is disclosed that is configured to support an integrated sensor-lens assembly (ISLA) of a digital image capturing device (DICD). The module includes a mounting structure that is connectable to the DICD and configured to receive a fastener, and at least one dampener that is positionable between the mounting structure and the DICD. The at least one dampener is configured to reduce forces, vibrations, etc., transmitted from the DICD to the module and the ISLA, and includes an aperture that is configured to receive the fastener such that the fastener extends through mounting structure and the at least one dampener into the DICD.

In certain embodiments, the at least one dampener may include a material having a durometer within the range of approximately 10 D to approximately 100 D.

In certain embodiments, the at least one dampener may define a generally annular cross-sectional configuration.

In certain embodiments, the at least one dampener may be generally toroidal in configuration, whereas in other embodiments, the at least one dampener may define generally planar opposing surfaces.

In another aspect of the present disclosure, an internal module is disclosed that is configured to support an integrated sensor-lens assembly (ISLA) of a digital image capturing device (DICD). The module includes a first dampener having a first configuration and a second dampener having a second, different configuration. Each of the first and second dampeners is configured for positioning between a body portion of the module and the DICD, and is adapted to reduce forces, vibrations, etc., transmitted to the ISLA through the module.

In certain embodiments, the first dampener may be configured as a gasket and the second dampener may define a generally annular cross-sectional configuration.

In another aspect of the present disclosure, a method of assembling a digital image capturing device (DICD) is disclosed. The method includes securing an integrated sensor-lens assembly (ISLA) to a cradle configured for positioning within a housing of the DICD; positioning at least one dampener between the cradle and the housing of the DICD; and securing the cradle and the ISLA to the housing of the DICD such that the at least one dampener is positioned between the cradle and the housing of the DICD to reduce forces, vibrations, etc., transmitted to the ISLA through the cradle.

In certain embodiments, positioning the at least one dampener may include positioning at least one dampener including a material having a durometer within the range of approximately 10 D to approximately 100 D.

In certain embodiments, positioning the at least one dampener may include positioning at least one dampener including a material selected from the group consisting of: polycarbonate, acrylonitrile-butadiene styrene (ABS), polyvinyl chloride (PVC), thermoplastic elastomer, silicone, rubber(s), and polymer(s).

In certain embodiments, positioning the at least one dampener may include positioning a gasket between the cradle and the housing of the DICD.

In certain embodiments, securing the module and the ISLA may include inserting at least one fastener into an aperture defined by the at least one dampener.

In certain embodiments, positioning the at least one dampener may include positioning at least one dampener that is generally annular in cross-sectional configuration.

In certain embodiments, positioning the at least one dampener may include positioning at least one generally toroidal dampener between the cradle and the housing of the DICD.

In certain embodiments, positioning the at least one dampener may include positioning the at least one dampener such that a first generally planar surface of the at least one dampener faces the cradle and a second generally planar surface of the at least one dampener faces the housing of the DICD.

In certain embodiments, securing the ISLA to the cradle may include positioning the ISLA such that light can pass through an opening defined by the cradle and into the ISLA.

In certain embodiments, securing the ISLA to the cradle may include inserting one or more fasteners into one or more mounts included on the cradle through the ISLA.

In certain embodiments, inserting the one or more fasteners into the mount(s) may include inserting a plurality of fasteners into a plurality of mounts spaced generally equidistant from one another.

In certain embodiments, securing the ISLA to the cradle may include positioning the ISLA within a concave receiving space defined by a generally curvate cross-sectional configuration of the cradle.

In another aspect of the present disclosure, a method is disclosed for reducing the transmission of forces, vibrations, etc., to an integrated sensor-lens assembly (ISLA) of a digital image capturing device (DICD). The method includes securing the ISLA to a module including a cradle that is configured to support the ISLA, and, thereafter, connecting the assembly of the ISLA and the cradle to a housing of the DICD. To reduce the transmission of forces, vibrations, etc., to the ISLA, one or more dampeners may be positioned between the ISLA and the cradle and/or between the cradle and the housing of the DICD.

In certain embodiments, fasteners may be used to connect the ISLA to the cradle. In such embodiments, the fasteners may be inserted through apertures defined by the dampeners prior to entering the cradle to reduce the transmission of forces, vibrations, etc., from the cradle to the ISLA.

In certain embodiments, securing the ISLA to the module may include inserting the fasteners into apertures defined in flanges provided on the ISLA.

In certain embodiments, securing the ISLA to the module may include inserting the fasteners into one or more mounts provided on the module.

In certain embodiments, inserting the fasteners into the one or more mounts provided on the module may include inserting the fasteners into a series of mounts spaced equidistant from one another.

In certain embodiments, connecting the assembly of the ISLA and the cradle to the housing of the DICD may include inserting fasteners through the one or more mounting structures provided on the cradle.

In certain embodiments, the fasteners may be inserted through one or more dampeners prior to entering the housing of the DICD to reduce the transmission of forces, vibrations, etc., from the DICD to the cradle.

In another aspect of the present disclosure, a method is disclosed for reducing the transmission of forces, vibrations, etc., to an integrated sensor-lens assembly (ISLA) of a digital image capturing device (DICD). The method includes connecting a module including a cradle to a housing of the DICD, and, thereafter, securing the ISLA to the cradle. To reduce the transmission of forces, vibrations, etc., to the ISLA, one or more dampeners may be positioned between the cradle and the housing of the DICD and/or between the ISLA and the cradle.

In certain embodiments, connecting the cradle to the housing of the DICD may include inserting fasteners through the one or more mounting structures provided on the cradle.

In certain embodiments, the fasteners may be inserted through one or more dampeners prior to entering the housing of the DICD to reduce the transmission of forces, vibrations, etc., from the DICD to the cradle.

In certain embodiments, fasteners may be used to connect the ISLA to the cradle. In such embodiments, the fasteners may be inserted through apertures defined by the dampeners prior to entering the cradle to reduce the transmission of forces, vibrations, etc., from the cradle to the ISLA.

In certain embodiments, securing the ISLA to the module may include inserting the fasteners into apertures defined in flanges provided on the ISLA.

In certain embodiments, securing the ISLA to the module may include inserting the fasteners into one or more mounts provided on the module.

In certain embodiments, inserting the fasteners into the one or more mounts provided on the module may include inserting the fasteners into a series of mounts spaced equidistant from one another.

DETAILED DESCRIPTION

The present disclosure describes various structures and methods for increasing the operable range of IMUs through the dampening of external forces. For example, in one aspect of the present disclosure, an internal module is disclosed that is configured to support an ISLA including an IMU within a DICD so as to reduce forces, vibrations, etc., transmitted from the DICD to the ISLA and/or the IMU. The module includes one or more dampeners that are configured, dimensioned, positioned, and adapted to absorb forces, vibrations, etc., to effectively increase the sensitivity range of the IMU and mitigate IMU saturation. Although the structures and methods discussed herein are generally described in the context of a DICD and an ISLA, the principles of the present disclosure are equally applicable to any technology that may benefit from the dampening of external forces, such as a LIDAR system. Throughout the present disclosure, use of the terms "forces," "vibrations," "frequencies," and variations thereof should be understood as referring to any force, vibration, acceleration, energy, etc., that may be transmitted from the DICD to the ISLA and/or the IMU during use.

Figure 1:
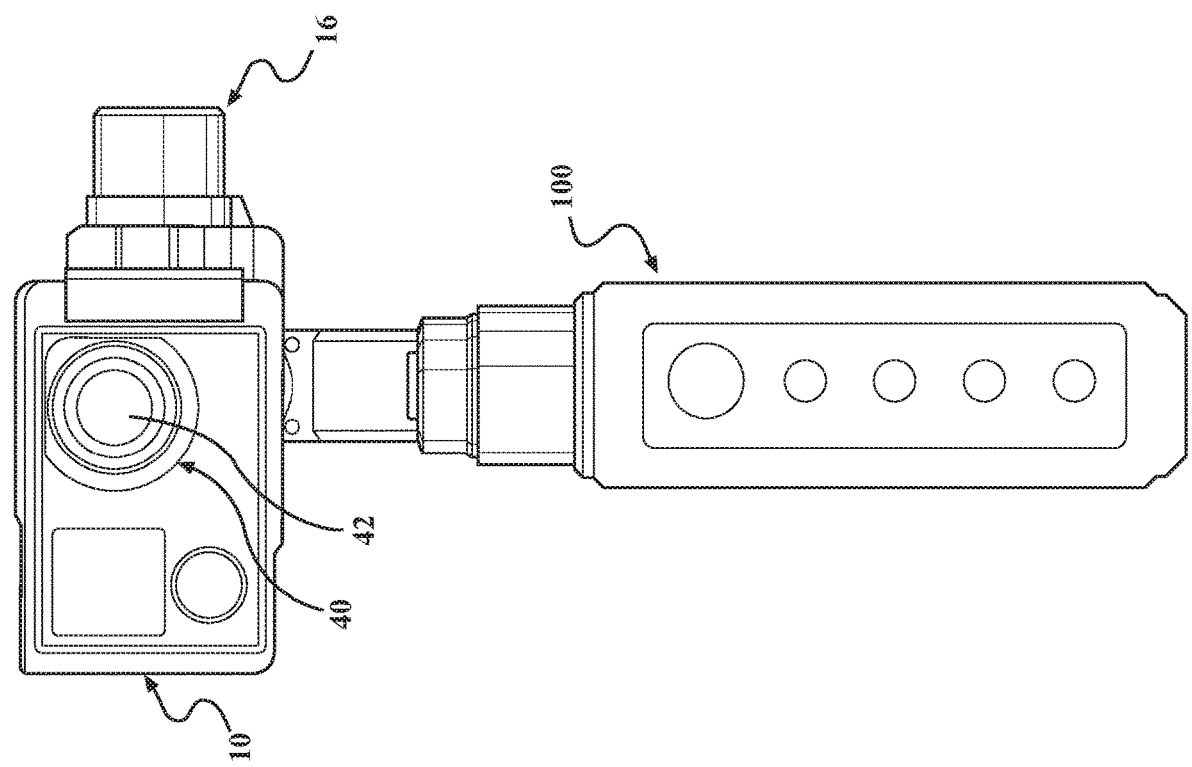
FIG. 1 is a rear view of a handheld apparatus shown in connection with an example DICD.
Figure 2:
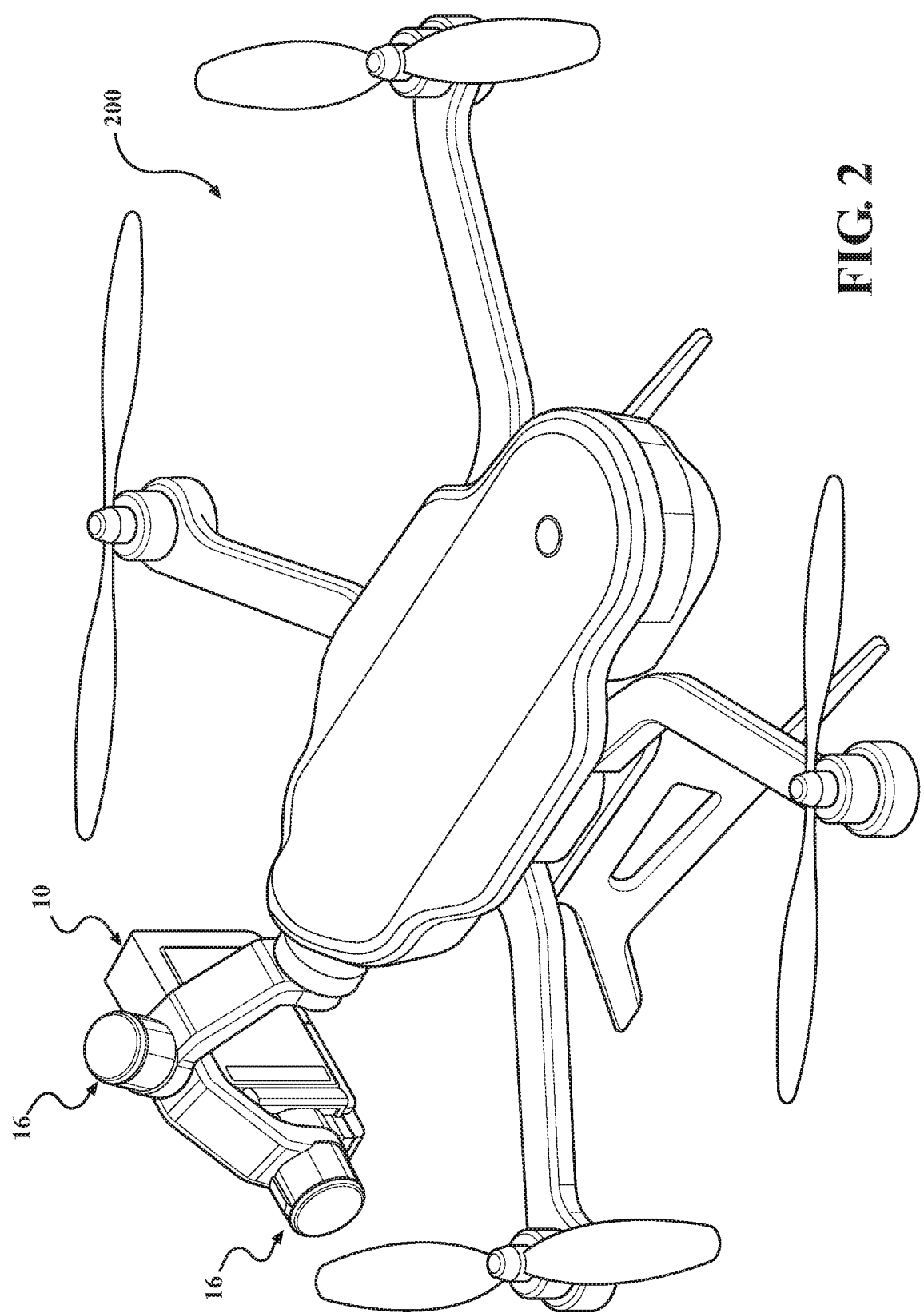
FIG. 2 is a top, perspective view of the DICD together with an example unmanned aerial vehicle.

With reference to FIGS. 1 and 2, an example DICD 10 is illustrated for use in capturing digital data including, for example, images, video, and audio. The principles of the present disclosure may find wide applicability in that the DICD 10 may be utilized in a variety of applications. For example, the DICD 10 may be incorporated into (or used with) a handheld apparatus 100 (FIG. 1), or a vehicle, such as the unmanned aerial vehicle (UAV) 200 seen in FIG. 2, an automobile, a bicycle, etc. The DICD 10 may also be configured and adapted for use in connection with a wearable support (not shown), such as a vest, glove, helmet, hat, etc., or may simply be carried by a user.

In various embodiments, the UAV 200 may include different features and may be adapted for different forms of operation. For example, the UAV 200 may be movable between an open (or flight) configuration, in which the arms and propellers extend outwardly from a body of the UAV 200, and a closed (or storage/transport) configuration, in which the arms and propellers are positioned in proximity to the body of the UAV 200.

In the open (flight) configuration, shown in FIG. 2, the arms are positioned as illustrated to allow the UAV 200 to take off, fly, and land. It is envisioned that the UAV 200 may be adapted to ascend vertically, to hover, fly, and land either via user control or autonomously. When in the open (flight) configuration, the arms and other movable components of the UAV 200 can be locked in place via one or more locking mechanisms to maintain the open (flight) configuration.

It is also envisioned that in certain embodiments of the UAV 200, the arms and/or the propellers may be removed to reduce any likelihood of damage during transport and/or storage. To facilitate reconfiguration between the open configuration and the closed configuration, it is envisioned that the arms may include one or more pivotable connections to permit articulating movement of the arms.

Figure 3:
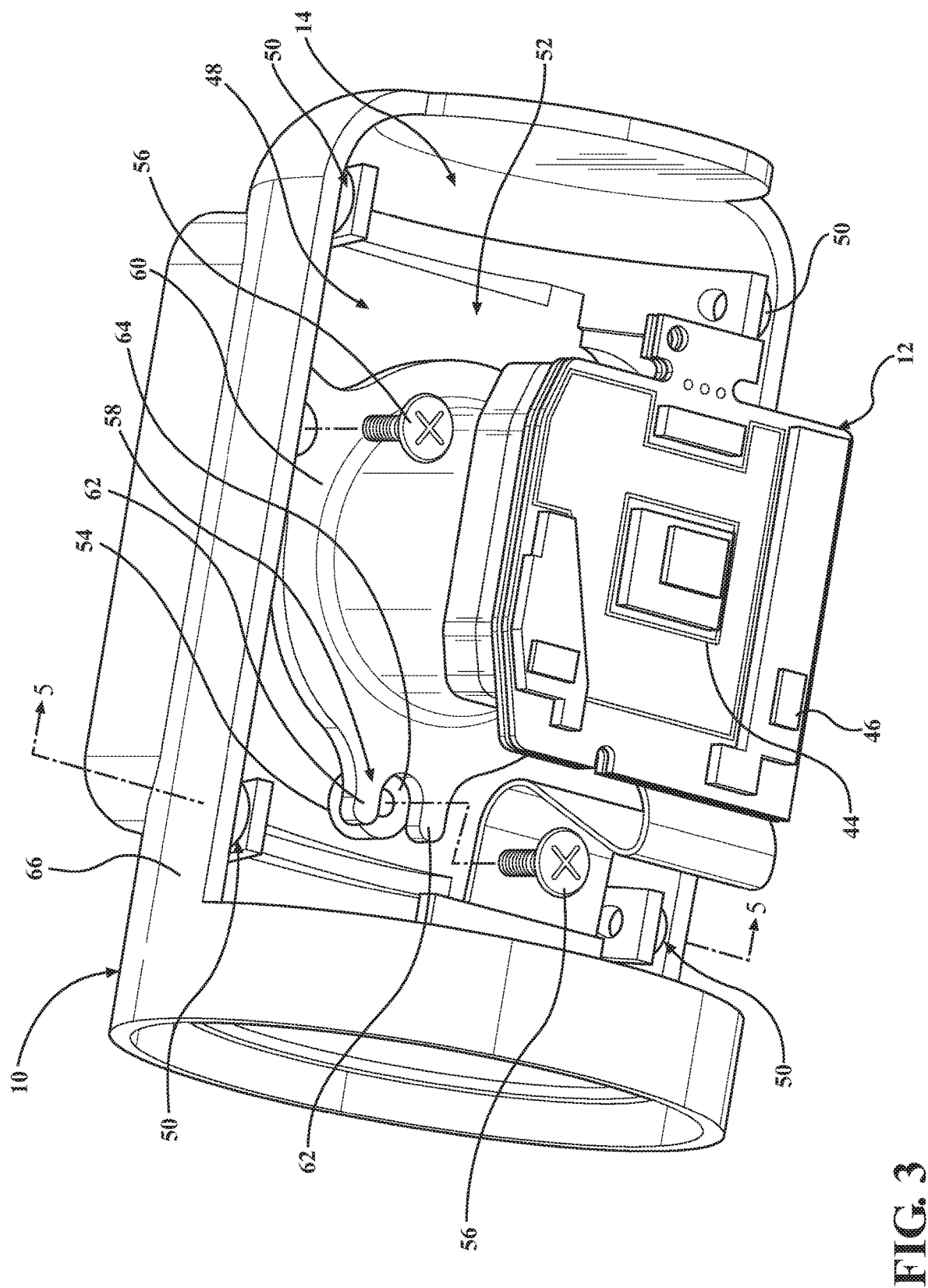
FIG. 3 is a partial, rear, perspective view of the DICD with parts removed showing an ISLA connected to the DICD via an internal module in accordance with the principles of the present disclosure.
Figure 4:
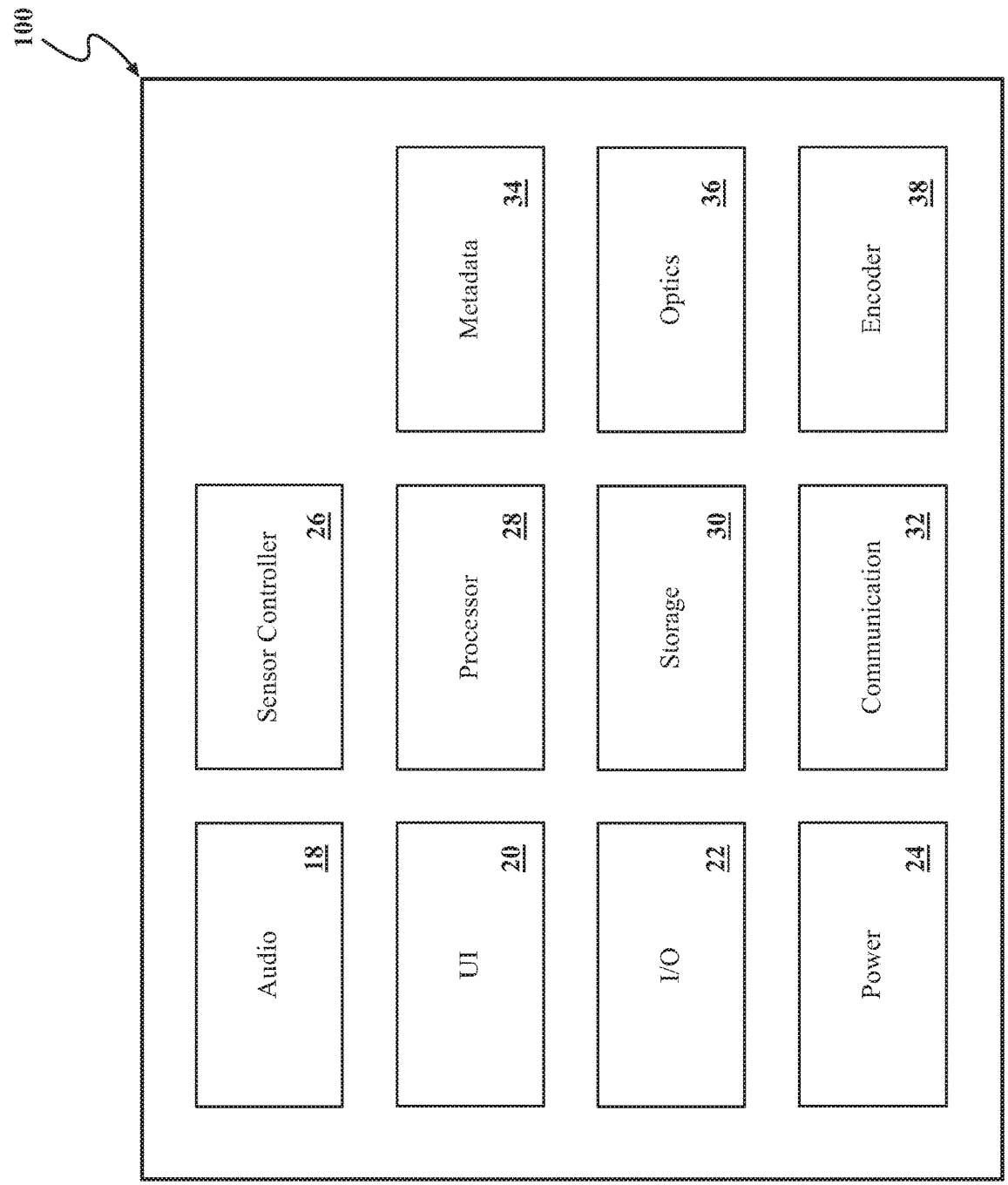
FIG. 4 is a schematic illustration of additional components of the DICD.

With reference to FIG. 3 as well, the DICD 10 includes an ISLA 12 and an internal module 14 that is configured to support the ISLA 12 and dampen frequencies and forces communicated to the ISLA 12 to increase image and/or video quality, as discussed hereinbelow. To further increase image and/or video quality, in certain embodiments, the DICD 10 may also include one or more gimbal systems 16 (FIGS. 1, 2) to stabilize the DICD 10 during image and/or video capture by offsetting movement of the DICD 10. To support the various functions of the DICD 10, the DICD 10 may also include a variety of internal components, such as, for example, an audio component 18 (FIG. 4), a user interface (UI) unit 20, an input/output (I/O) unit 22, a power system 24, a sensor controller 26, a processor 28, an electronic storage unit 30, a communication unit 32, a metadata unit 34, an optics unit 36, and/or an encoder 38.

The ISLA 12 includes one or more optical element(s) 40 (FIGS. 1, 5), such as, for example, one or more lenses 42, an IMU 44 (FIG. 3), and a sensor 46 (FIG. 3). Suitable examples of the sensor 46 include a charge-coupled device (CCD) sensor, an active pixel sensor (APS), a complementary metal-oxide semiconductor (CMOS) sensor, an N-type metal-oxide semiconductor (NMOS) sensor, and/or any other image sensor or combination of image sensors.

The optical element(s) 40 (FIGS. 1, 5) have an associated field of view that extends in lateral and longitudinal directions. For example, the field of view may extend 90° in a lateral direction and 120° in a longitudinal direction. It should be appreciated, however, that the capabilities of the particular optical element(s) 40 employed in the DICD 10 may be varied in alternate embodiments to increase or decrease the field of view in the lateral direction and/or the longitudinal direction. Suitable optical element(s) 40 may include one or more macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, and perspective control lenses. In certain implementations of the DICD 10, multiple, overlapping fields of view may be employed to increase the capability of the DICD 10, such as through the use of two or more optical elements 40. For example, a first optical element 40 may be used to capture a first fisheye image (e.g., a round or elliptical image), which may be transformed into a first rectangular image, and a second optical element 40 may be used to capture a second fisheye image (e.g., a round or elliptical image), which may be transformed into a second rectangular image. The first and second rectangular images may then be arranged side-by-side to create overlapping portions that can be stitched together to form a single planar image.

With reference now to FIGS. 3 and 5-7, the module 14 will be discussed. The module 14 includes a cradle 48 that supports the ISLA 12 and the IMU 44 (FIG. 3), as well as one or more dampeners 50. Throughout the present disclosure and in the figures, the IMU 44 is shown and described as being rigidly connected to the ISLA 12. It should be appreciated, however, that the particular locations, dimensions, and configurations of the various components described herein may be varied in alternate embodiments of the disclosure. For example, the particular location of the IMU 44, as well as the manner in which the IMU 44 is connected to the ISLA 12 or other suitable component of the DICD 10 (e.g., depending on the particular specifications, dimensions, manufacturing tolerances, intended use, etc., of the DICD 10), may be varied.

The cradle 48 is configured in correspondence with both the ISLA 12 and the DICD 10 to facilitate connection of the ISLA 12 to the cradle 48, and connection of the cradle 48 to the DICD 10. Accordingly, in various embodiments, the particular configuration and dimensions of the cradle 48 may be varied to accommodate use with a variety of ISLAs 12. The cradle 48 may include (e.g., may be formed from) any material or combination of materials suitable for the intended purposes of supporting the ISLA 12 and dampening external frequencies and vibrations in accordance with the discussion below. For example, the cradle 48 may include (e.g., may be formed from) polymers, plastics, etc.

The cradle 48 includes a body portion 52 having a series of internal mounts 54 (FIGS. 3, 6) that are configured to receive fasteners 56 (e.g., screws, pins, rivets, etc.) to connect the ISLA 12 to the cradle 48. To facilitate connection of the ISLA 12 to the cradle 48, it is envisioned that the ISLA 12 may include one or more flanges 58 (FIG. 3), or other such structure, that are configured to receive or support the fasteners 56. As seen in FIG. 3, the flanges 58 are positioned in correspondence with the internal mounts 54 to allow for passage of the fasteners 56 through the ISLA 12 and into the cradle 48. Although illustrated as extending from a collar 60 of the ISLA 12 in the embodiment seen in FIG. 3, and as including a forked configuration defining a pair of legs 62 that describe one or more apertures 64, in alternate embodiments, the particular geometry of the ISLA 12 employed to facilitate connection to the cradle 48 may be varied. For example, an embodiment devoid of the flanges 58 is envisioned in which the aperture(s) 64 may be formed directly in the collar 60 of the ISLA 12.

In the particular embodiment of the module 14 shown in the figures, the cradle 48 includes three mounts 54 and the ISLA 12 includes three corresponding flanges 58. While the mounts 54 and the flanges 58 are shown as being spaced generally equidistant from one another (i.e., such that the mounts 54 and the flanges 58 are separated by approximately 120°), in alternate embodiments, the location and/or number of the mounts 54 and the flanges 58 may be varied, for example, depending upon the configuration of the particular ISLA 12 used in the DICD 10.

The body portion 52 of the cradle 48 includes a generally curvate cross-sectional configuration in general correspondence with that defined by a housing 66 (FIG. 3) of the DICD 10. More specifically, the body portion 52 defines a concave receiving space 68 (FIG. 5) that accommodates the optical element 40 of the ISLA 12. It should be appreciated, however, that the specific configuration and dimensions of the cradle 48 may be varied in alternate embodiments of the present disclosure. For example, the concavity of the receiving space 68 may be increased or decreased (e.g., depending upon the particular optical element 40 used in the ISLA 12), or may be eliminated altogether such that the cradle 48 includes a body portion 52 that is generally planar in configuration (not shown).

The body portion 52 of the cradle 48 defines an opening 70 (FIGS. 6, 7) that is configured in correspondence with the optical element 40 (FIG. 5) of the ISLA 12 to allow for the passage of light through the cradle 48 into the ISLA 12. Although shown as being generally circular in configuration and centrally positioned, in various embodiments of the cradle 48, the specific configuration, dimensions, and position of the opening 70 may be altered or varied (e.g., to permit use with a variety of ISLAs 12). Additionally, although shown as including a single opening 70 in the illustrated embodiment, alternate embodiments including additional openings 70 would also be within the scope of the present disclosure.

The cradle 48 further includes a mounting structure 72 (FIG. 6) supported by the body portion 52, which is configured as brackets 74 in the illustrated embodiment. The brackets 74 are configured in correspondence with a corresponding mounting structure 76 (FIG. 5) included on the housing 66 of the DICD 10. The brackets 74 define apertures 78 that are configured to receive fasteners 80 (FIG. 6) (e.g., screws, pins, rivets, etc.) to connect the cradle 48 to the housing 66 of the DICD 10. Although shown as including four brackets 74 positioned in corner sections of the cradle 48, in alternate embodiments, the number and location of the brackets 74 may be varied without departing from the scope of the present disclosure.

With reference now to FIGS. 8-12, the dampeners 50 will be discussed. Although shown as including four (4) dampeners 50 throughout the figures, it should be appreciated that in alternate embodiments of the module 14, the dampeners 50 may be present in either greater or fewer numbers (e.g., depending upon the degree to which dampening is desired or necessitated). The dampeners 50 are generally annular in cross-sectional configuration, and each defines an aperture 82 that extends therethrough. The dampeners 50 are adapted to absorb forces, vibrations, etc., to which the DICD 10 is subjected during use to reduce transmission to the ISLA 12 and/or the IMU 44 (FIG. 3), and may include (e.g., may be formed from) any material suitable for this intended purpose. For example, suitable materials for use in the construction of the dampeners 50 include, but are not limited to, polycarbonate, acrylonitrile-butadiene styrene (ABS), polyvinyl chloride (PVC), thermoplastic elastomer, silicone, rubber(s), and polymer(s). It is envisioned that the dampeners 50 may be formed through any suitable manufacturing process, such as, for example, injection molding, coating, etc.

The particular material(s) used in the construction of the dampeners 50 may be varied depending, for example, upon the particular intended use of the DICD 10 or the amount of dampening that may be required. For example, the dampeners 50 may be designed to eliminate all frequencies above a particular threshold (e.g., 1 kHz). In circumstances or environments in which the DICD 10 may be subjected to higher forces, frequencies, etc., the dampeners 50 may include (e.g., may be formed from) harder material(s) having a higher durometer within the range of approximately 80 D to approximately 100 D. In circumstances or environments in which the DICD 10 may be subjected to lower forces, frequencies, etc., however, the dampeners 50 may include (e.g., may be formed from) softer material(s) having a lower durometer within the range of approximately 10 D to approximately 20 D.

The dampeners 50 are configured for positioning between the housing 66 of the DICD 10 and the cradle 48 (FIGS. 3, 5) of the module 14 such that forces, vibrations, etc., applied to the DICD 10 are absorbed by the dampeners 50 before reaching the module 14 to lessen transmission to the ISLA 12 and/or the IMU 44. In certain embodiments, to further reduce the forces, vibrations, etc., that are transmitted to the ISLA 12 and/or the IMU 44, it is envisioned that the dampeners 50 may also be positioned between the cradle 48 and the ISLA 12 (e.g., adjacent to the internal mounts 54 seen in FIGS. 3, 6). In such implementations, depending upon the particular configuration and dimensions of the ISLA 12, the cradle 48, and the DICD 10, it is envisioned that the dampeners 50 positioned between the DICD 10 and the cradle 48 and the dampeners 50 positioned between the cradle 48 and the ISLA 12 may be identical in configuration and dimensions. Alternatively, however, it is envisioned that the dampeners 50 positioned between the DICD 10 and the cradle 48 may include a first configuration and that the dampeners 50 positioned between the cradle 48 and the ISLA 12 may include a second, different configuration, examples of which are discussed below.

Figure 8:
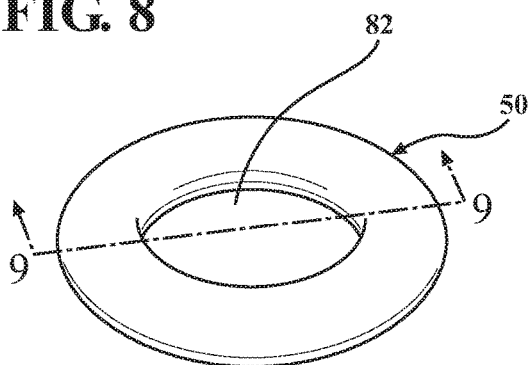
FIG. 8 is a perspective view of one embodiment of a dampener for use with the DICD and the module.
Figure 9:
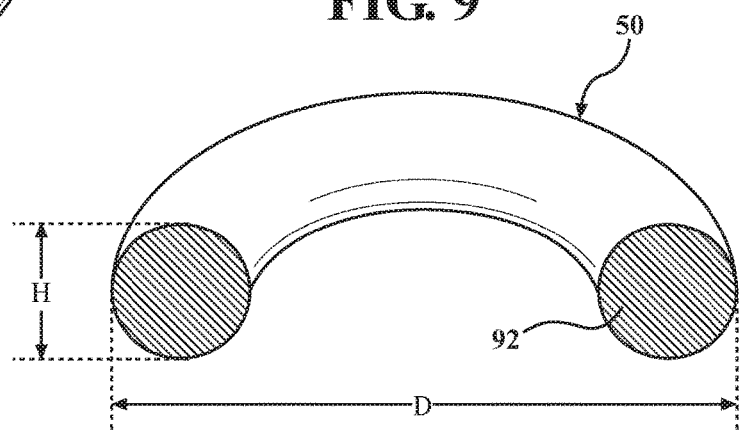
FIG. 9 is a cross-sectional view taken along line 9-9 in FIG. 8.
Figure 10:
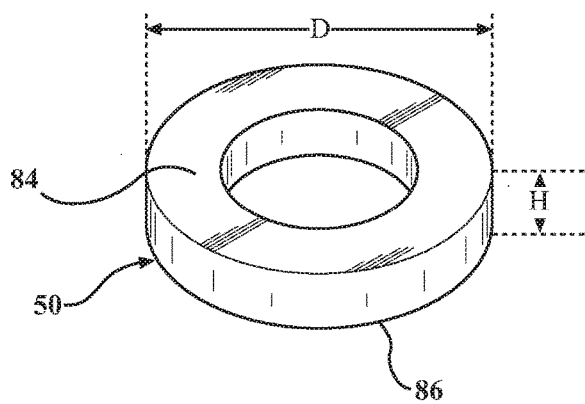
FIG. 10 is a perspective view of an alternate embodiment of the dampener.

With reference to FIG. 9, the dampeners 50 define longitudinal and transverse cross-sectional dimensions (i.e., heights and diameters H and D, respectively). In the particular embodiment seen in FIGS. 8 and 9, for example, the dampeners 50 are generally toroidal in configuration whereby the height H of the dampeners 50 varies across the diameter D. In alternate embodiments, however, the particular configuration and dimensions of the dampeners 50 may be varied. For example, as seen in FIG. 10, the dampeners may be disc-shaped so as to define generally planar opposing surfaces 84, 86 such that the height H of the dampeners 50 is uniform across the diameter D.

Figure 11:
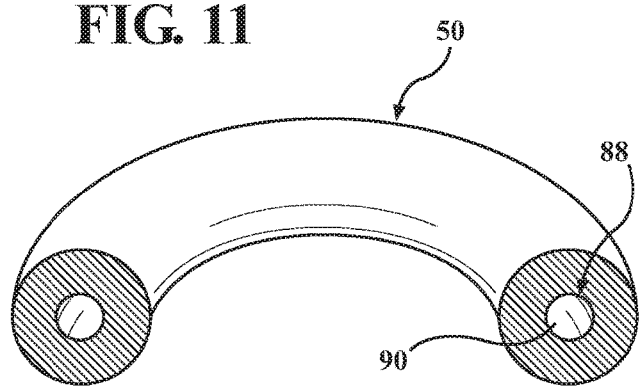
FIG. 11 is a cross-sectional view of another embodiment of the dampener including an internal cavity.

As seen in FIG. 9, the dampeners 50 may be solid and generally uniform in cross-section. Alternatively, it is contemplated that the dampeners 50 may include a non-uniform cross-sectional construction. For example, as seen in FIG. 11, the dampeners 50 may define an internal cavity 88 (e.g., a channel 90), which may be adapted to retain one or more fluids (e.g., air) to vary the absorption capabilities of the dampeners 50.

Figure 12:
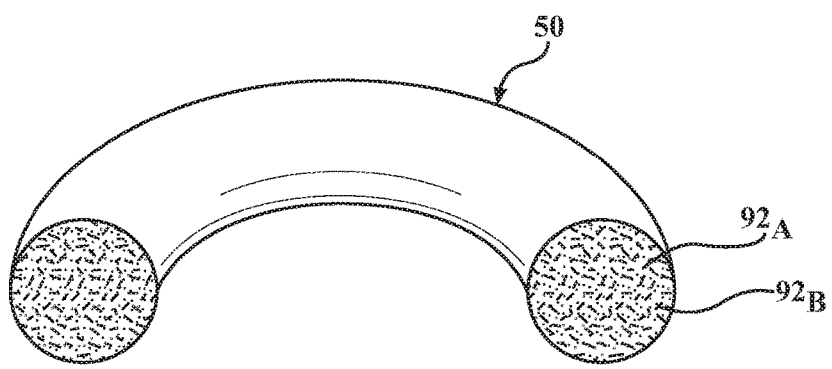
FIG. 12 is a cross-sectional view of another embodiment of the dampener including multiple materials of construction in a uniform arrangement.
Figure 13:
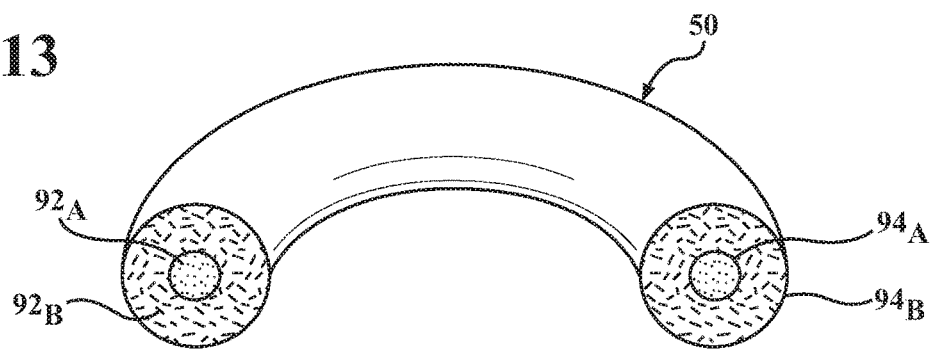
FIG. 13 is a cross-sectional view of another embodiment of the dampener including multiple materials of construction in a layered arrangement.

It is envisioned that the dampeners 50 may include (e.g., may be formed from) a single material 92 of construction, as shown in FIG. 9. Alternatively, however, the dampeners 50 may include multiple materials of construction, as shown in FIGS. 12 and 13, to allow for additional variation in the absorption capabilities of the dampeners 50. For example, the dampeners 50 may include a first material $92_A$ and a second, different material $92_B$. As shown in FIG. 12, the materials $92_A$, $92_B$ may be incorporated together such that the materials $92_A$, $92_B$ are distributed in a generally uniform manner. Alternatively, however, it is envisioned that the materials $92_A$, $92_B$ may be distributed in a non-uniform manner. For example, FIG. 13 illustrates an embodiment in which the dampeners 50 include an inner layer $94_A$ formed from the first material $92_A$ and an outer layer $94_B$ formed from the second material $92_B$. Although shown as including two materials $92_A$, $92_B$ arranged into two layers $94_A$, $94_B$, in additional embodiments of the disclosure, the number of materials 92 and/or the number of layers 94 may be varied to achieve any desired performance characteristics of the dampeners 50.

Figure 14:
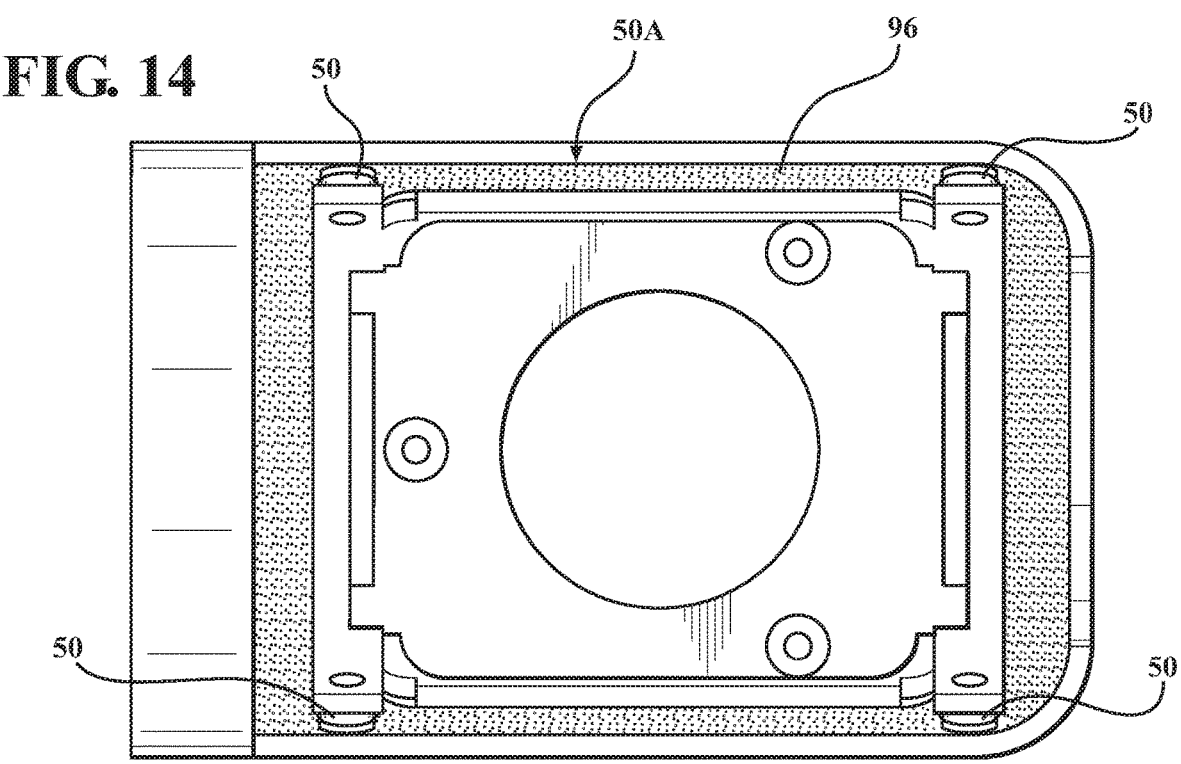
FIG. 14 is a rear view of the module positioned within the DICD with the ISLA removed shown with various embodiments of the dampener.

FIG. 14 illustrates another embodiment of the disclosure in which the module 14 includes a first series of dampeners 50 and one or more second dampeners $50_A$. The second dampener $50_A$ is configured as one or more elongate gaskets 96, seals, or the like and extends partially or entirely about the periphery of the cradle 48. In such implementations, it is envisioned that the absorption characteristics and materials of construction for the dampeners 50, $50_A$ may be either generally identical or dissimilar. For example, in one particular embodiment, the dampener 50 may include the first material $92_A$ and the dampener $50_A$ may include the second material $92_B$.

It is envisioned that the particular material(s) used in the construction of the dampeners 50, the number of dampeners 50, and the particular configurations, dimensions, and locations of the dampeners 50 may be customized to fit a particular ISLA 12 and/or use of the DICD 10. For example, a modal analysis may be conducted prior to construction and assembly of the DICD 10 to achieve a particular dampening effect, to identify particular materials for use in the construction of the dampeners 50, and/or to identify particular configurations and/or dimensions for the dampeners 50 for use in the DICD 10.

Figure 5:
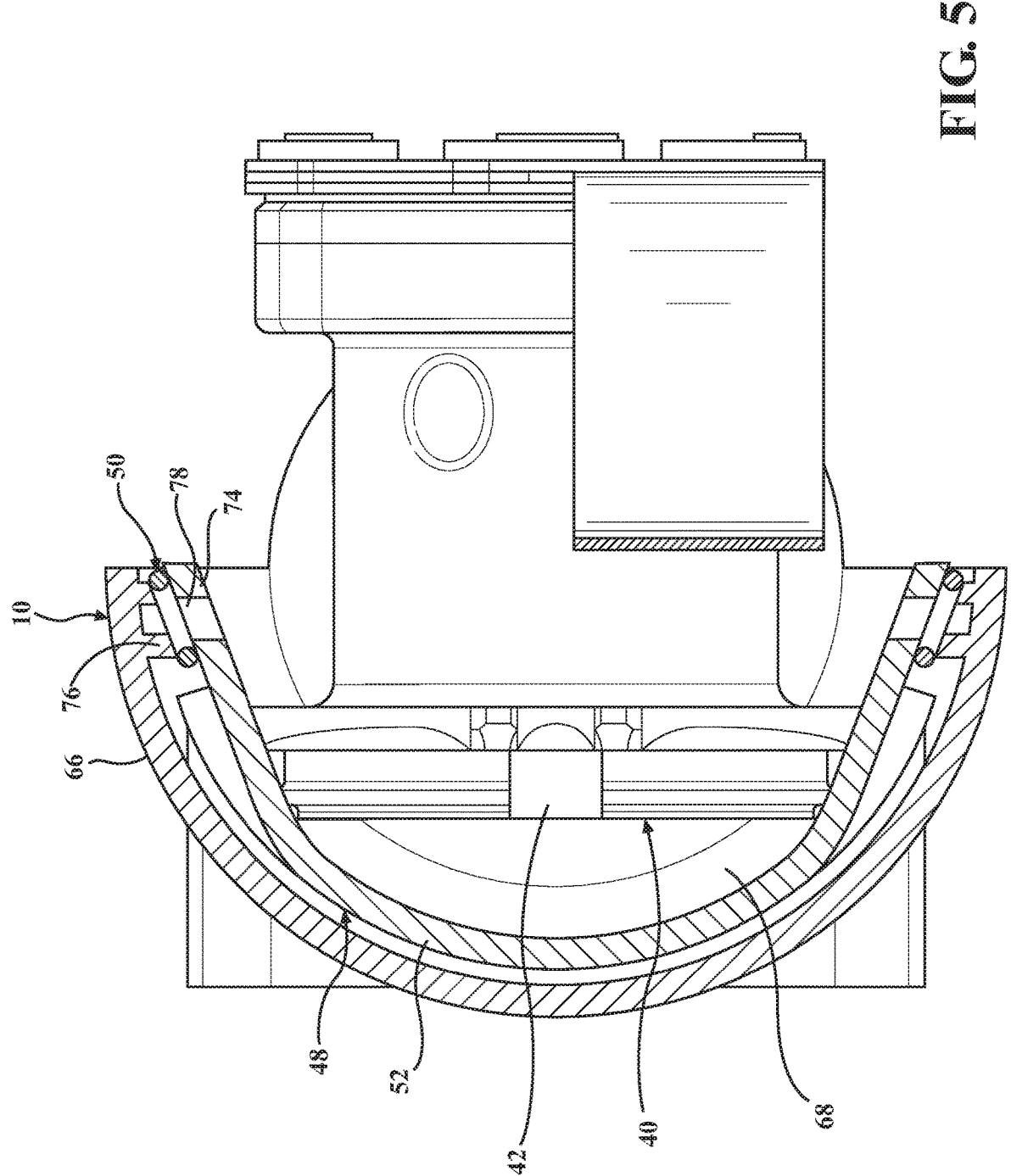
FIG. 5 is a cross-sectional view taken along line 5-5 in FIG. 3.
Figure 6:
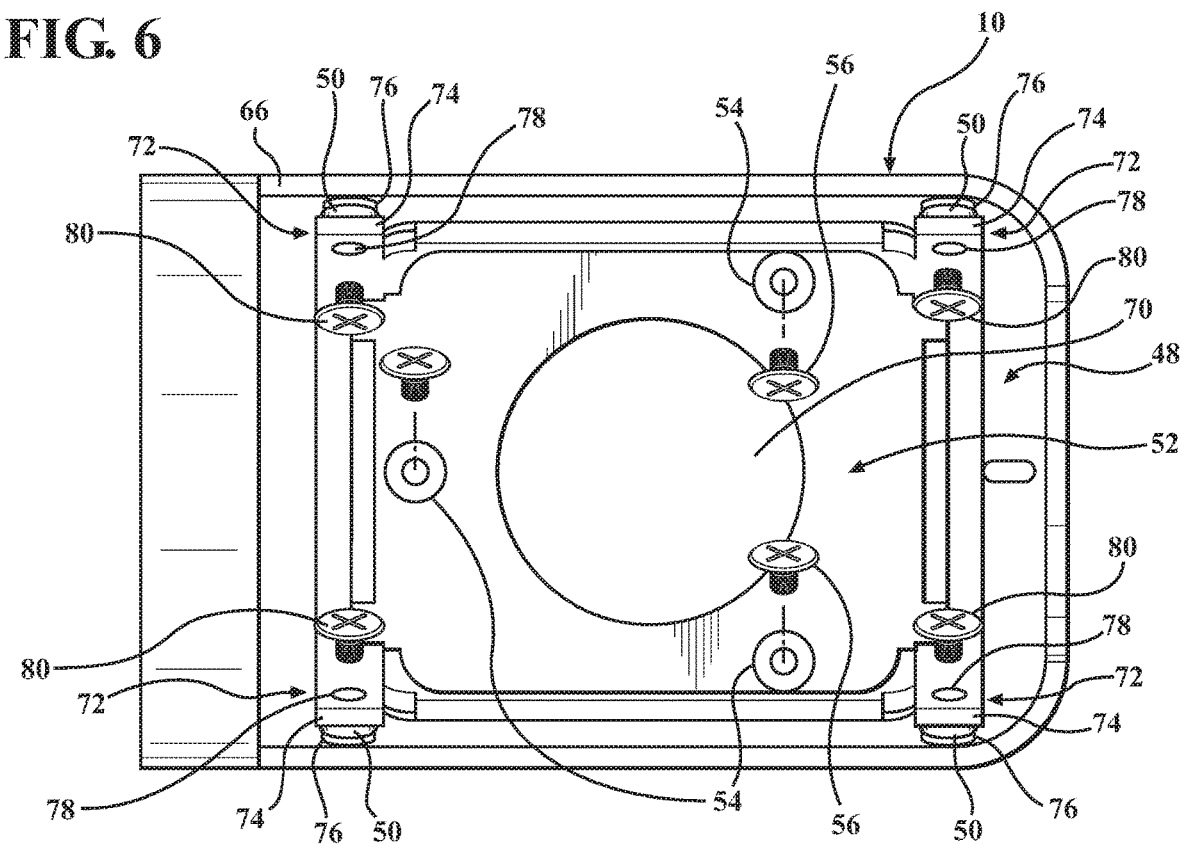
FIG. 6 is a rear view of the module positioned within the DICD with the ISLA removed.
Figure 7:
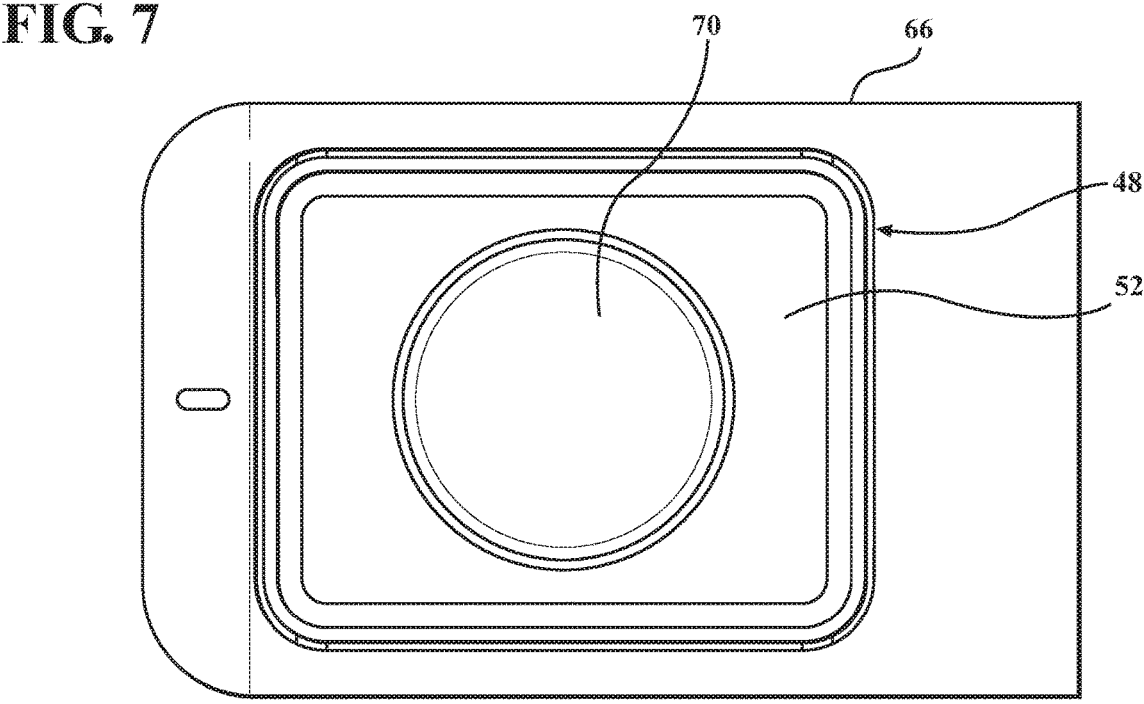
FIG. 7 is a front view of the module and the DICD.

With reference now to FIGS. 3 and 5, use and operation of the module 14 will be discussed in connection with the DICD 10. As mentioned above, it is envisioned that the DICD 10 may be utilized in situations or environments in which the DICD 10 may be subjected to a variety of external forces which may differ in magnitude, frequency, direction, source, etc. For example, when mounted to a vehicle, such as a car or a bicycle, during operation of the vehicle, the forces, vibrations, etc. to which the vehicle is subjected are communicated to the DICD 10, travel through the housing 66 to the module 14, and are ultimately communicated to the ISLA 12 and the IMU 44. The dampeners 50 positioned between the cradle 48 of the module 14 and the housing 66, however, absorb the forces, vibrations, etc., such that they are reduced in magnitude, frequency, etc., prior to reaching the ISLA 12 and/or the IMU 44 (FIG. 3). Since the IMU 44 is mounted directly to the ISLA 12 in the particular embodiment illustrated in the figures, the IMU 44 and the ISLA 12 are dampened simultaneously. In the context of an IMU 44 with 2G sensitivity, for example, in the absence of dampeners 50, were the IMU 44 exposed to forces in excess of 2G (e.g., 3G forces), the IMU 44 may become saturated, thereby potentially causing horizon drift and other undesirable effects. Through the employ of the dampeners 50, however, the magnitude and/or frequency of the forces, vibrations, etc., can be reduced to fall within the sensitivity range of the IMU 44 (e.g., from 3G to 1.7G) to guard against saturation and thereby maintain proper operation of the IMU 44 and remove noise and other such interference that might have otherwise occurred in the absence of the dampeners 50.

Figure 15:
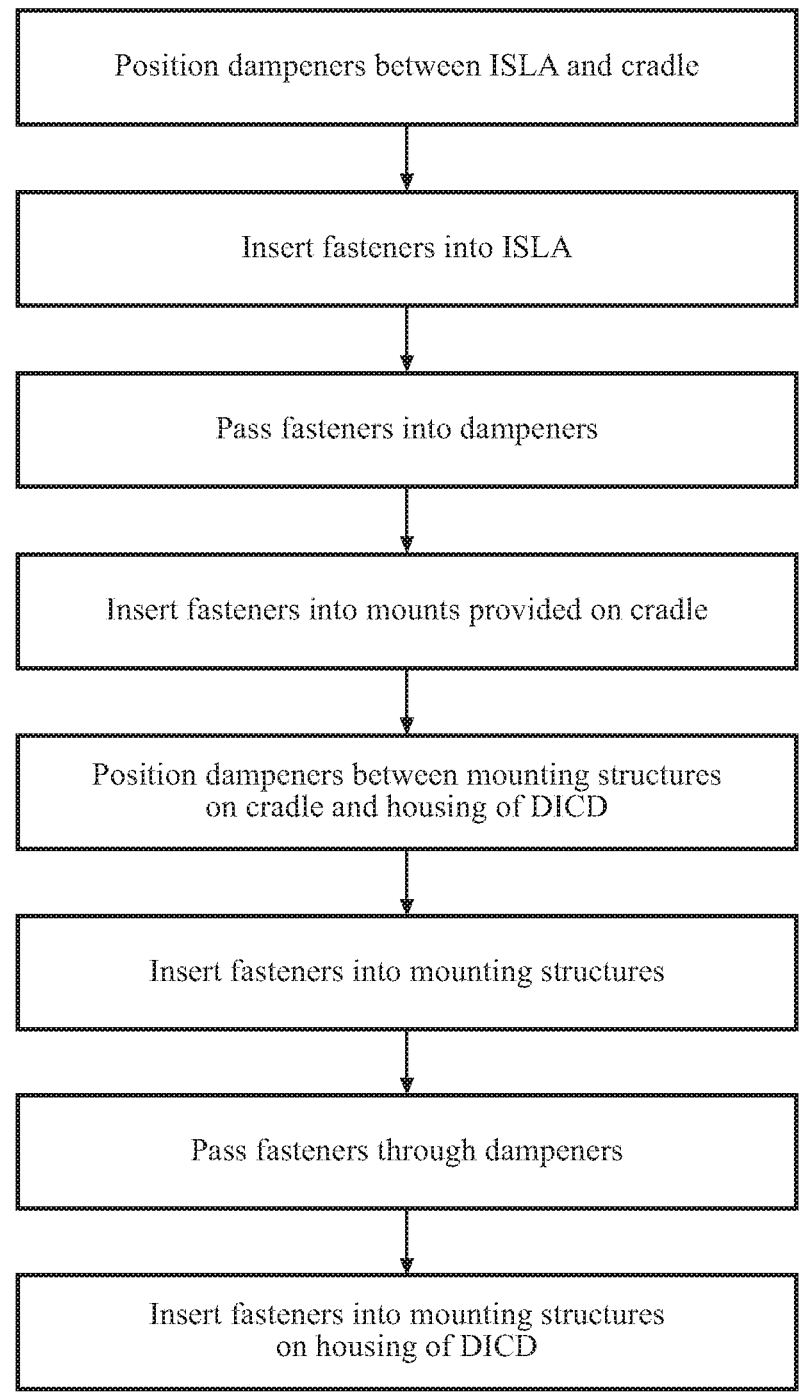
FIG. 15 is a flow diagram illustrating one method of assembling the DICD, the ISLA, and the module.

FIG. 15 illustrates one method of assembling the DICD 10, the ISLA 12, and the module 14. Initially, the ISLA 12 may be secured to the cradle 48 via fasteners 56 (FIG. 3). More specifically, the fasteners 56 are inserted through the aperture(s) 64 in the flanges 58 and into the internal mounts 54. As indicated above, one or more dampeners 50 may be positioned adjacent to the internal mounts 54, between the cradle 48 and the ISLA 12, to reduce the magnitude and/or frequency of the forces, vibrations, etc., transmitted from the cradle 48 to the ISLA 12 and, ultimately, to the IMU 44. To secure the dampeners 50 between the ISLA 12 and the cradle 48, the fasteners 56 may be inserted through the dampeners 50 via the apertures 82 (FIG. 8). After connecting the ISLA 12 and the cradle 48, the assembly may be connected to the DICD 10 by inserting fasteners 80 (FIG. 6) through the aperture(s) 78 in the mounting structure 72 provided on the cradle 48 and into the mounting structures 76 (FIG. 5) provided on the housing 66 of the DICD 10. To reduce the magnitude and/or frequency of the forces, vibrations, etc., transmitted from the DICD 10 to the assembled ISLA 12 and cradle 48, one or more of the dampeners 50 may be positioned between the mounting structure 72 and the housing 66 of the DICD 10. To secure the dampeners 50 between the cradle 48 and the DICD 10, the fasteners 80 may be inserted through the dampeners 50 via the apertures 82.

Figure 16:
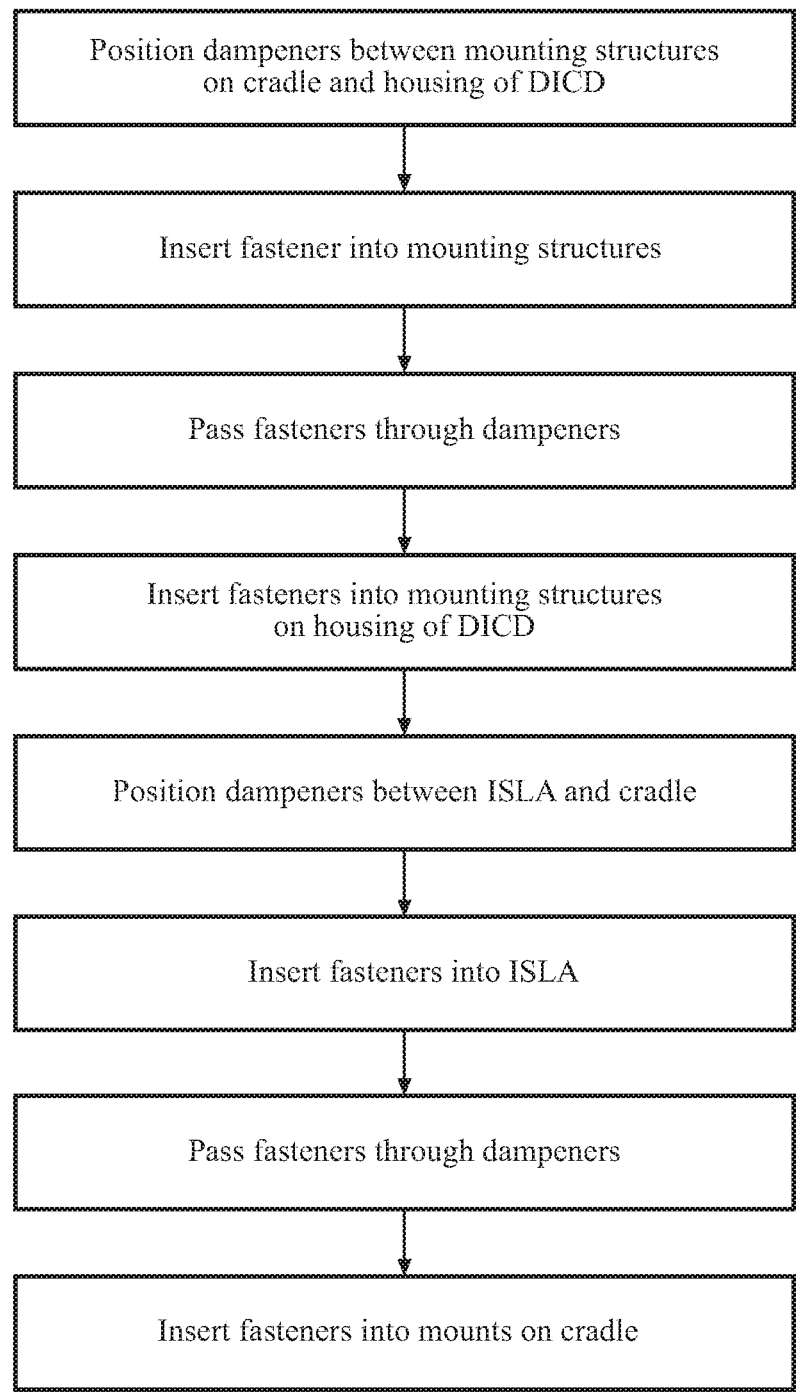
FIG. 16 is a flow diagram illustrating another method of assembling the DICD, the ISLA, and the module.

FIG. 16 illustrates an alternate method of assembling the DICD 10, the ISLA 12, and the module 14 in which the cradle 48 may be secured to the DICD 10 prior to connecting the ISLA 12 to the cradle 48. More specifically, the fasteners 80 (FIG. 6) are inserted through the aperture(s) 78 in the mounting structures 72, through the apertures 82 (FIG. 8) defined by the dampeners 50, and into the mounting structures 76 (FIG. 5) provided on the housing 66 of the DICD 10 such that the dampeners 50 are positioned between the cradle 48 and the housing 66. Thereafter, the dampeners 50 may be positioned between the ISLA 12 and the cradle 48, and the fasteners 56 (FIG. 3) are inserted through the flanges 58 provided on the ISLA 12, through the dampeners 50, and into the internal mounts 54 provided on the cradle 48.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure, and will appreciate further features and advantages of the presently disclosed subject matter based on the description provided. Variations, combinations, and/or modifications to any of the embodiments and/or features of the embodiments described herein are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of" Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "upward," "downward," "inward," "outward," etc., should be understood to describe a relative relationship between structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various steps, elements, components, regions, and/or sections, these steps, elements, components, regions, and/or sections should not be limited by use of these terms in that these terms are used to distinguish one step, element, component, region, or section from another. Thus, unless expressly stated otherwise, a first step, element, component, region, or section could be termed a second step, element, component, region, or section without departing from the scope of the present disclosure.

Each and every claim is incorporated as further disclosure into the specification, and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capturing system, comprising:
   a handheld apparatus; and
   a digital image capturing device (DICD) supported by the handheld apparatus, the DICD including:
      an outer housing including a first mounting structure, the first mounting structure including a first opening located at a first corner of the outer housing, a second opening located at a second corner of the outer housing, a third opening located at a third corner of the outer housing, and a fourth opening located at a fourth corner of the outer housing; and
      a module having a main body portion and supporting an integrated sensor-lens assembly (ISLA), the module being positioned within an internal cavity defined by the outer housing and including a second mounting structure configured in correspondence with the first mounting structure to facilitate connection of the module to the outer housing within the internal cavity, the second mounting structure including a first bracket with a first aperture formed therein located at a first corner of the module, a second bracket with a second aperture formed therein located at a second corner of the module, a third bracket with a third aperture formed therein located at a third corner of the module, and a fourth bracket with a fourth aperture formed therein located at a fourth corner of the module, each of the brackets extending outwardly beyond a perimeter of the main body portion of the module, the module being configured such that the apertures in the brackets are alignable with the openings in the outer housing, wherein the openings in the outer housing and the apertures in the brackets are each configured to receive a fastener to secure the module to the outer housing.

2. The image capturing system of claim 1, wherein the DICD further includes an inertial measurement unit supported on the ISLA.

3. The image capturing system of claim 1, wherein the ISLA includes a sensor selected from the group consisting of a charge-coupled device (CCD) sensor, an active pixel sensor (APS), a complementary metal-oxide semiconductor (CMOS) sensor, and an N-type metal-oxide semiconductor (NMOS) sensor.

4. The image capturing system of claim 1, wherein the module includes a polymeric material.

5. The image capturing system of claim 1, wherein the module defines a generally polygonal cross-sectional configuration.

6. The image capturing system of claim 5, wherein the module defines an upper edge and a lower edge that extends in generally parallel relation to the upper edge.

7. The image capturing system of claim 1, wherein the handheld apparatus includes a forked support structure configured for connection to the DICD.

8. The image capturing system of claim 7, wherein the handheld apparatus further includes a series of gimbal assemblies, at least one of the gimbal assemblies being configured for connection to the forked support structure to facilitate rotation of the forked support structure and the DICD.

9. A digital image capturing device (DICD), comprising:
an integrated sensor-lens assembly (ISLA); and
a module configured to support the ISLA and having a main body portion, the module being positioned within an internal cavity of the DICD and including a first bracket located in a first corner and defining a first aperture configured to receive a first fastener, a second bracket located in a second corner and defining a second aperture configured to receive a second fastener, a third bracket located in a third corner and defining a third aperture configured to receive a third fastener, and a fourth bracket located in a fourth corner and defining a fourth aperture configured to receive a fourth fastener, the first, second, third, and fourth fasteners being configured to secure the module internally within the DICD, each of the brackets extending outwardly beyond a perimeter of the main body portion of the module.

10. The DICD of claim 9, further including an inertial measurement unit supported on the ISLA.

11. The DICD of claim 9, wherein the ISLA includes a sensor selected from the group consisting of a charge-coupled device (CCD) sensor, an active pixel sensor (APS), a complementary metal-oxide semiconductor (CMOS) sensor, and an N-type metal-oxide semiconductor (NMOS) sensor.

12. The DICD of claim 9, wherein the module is configured to dampen frequencies and/or forces communicated to the ISLA.

13. The DICD of claim 9, wherein the module includes a polymeric material.

14. The DICD of claim 9, wherein the module defines a generally polygonal cross-sectional configuration.

15. The DICD of claim 14, wherein the module defines an upper edge and a lower edge that extends in generally parallel relation to the upper edge.

16. An integrated sensor-lens assembly (ISLA) module for a digital image capturing device (DICD), the ISLA module comprising:
a sensor selected from the group consisting of a charge-coupled device (CCD) sensor, an active pixel sensor (APS), a complementary metal-oxide semiconductor (CMOS) sensor, and an N-type metal-oxide semiconductor (NMOS) sensor;
a lens supported generally adjacent to the sensor; and
an internal cradle supporting the sensor and the lens, the internal cradle defining a mounting structure configured to facilitate connection of the ISLA module within an internal cavity of the DICD, the mounting structure including a first bracket defining a first aperture and located at a first corner of the internal cradle, a second bracket defining a second aperture and located at a second corner of the internal cradle, a third bracket defining a third aperture and located at a third corner of the internal cradle, and a fourth bracket defining a fourth aperture and located at a fourth corner of the internal cradle, the first, second, third, and fourth apertures each being configured to receive a fastener, each of the brackets extending outwardly beyond a perimeter of a main body portion of the internal cradle.

17. The ISLA module of claim 16, wherein the internal cradle defines a generally polygonal cross-sectional configuration.

18. The ISLA module of claim 17, wherein the internal cradle defines a first edge, and a second edge opposite the first edge, the second edge extending in generally parallel relation to the first edge.

* * * * *